US00RE35999E

United States Patent [19]

Gutknecht

[11] E Patent Number: Re. 35,999

[45] Reissued Date of Patent: Dec. 22, 1998

[54] HUMAN AMUSEMENT RIDE

[75] Inventor: Leroy H. Gutknecht, Las Vegas, Nev.

[73] Assignee: Thrilltime Entertainment International, Inc., Burnaby, Canada

[21] Appl. No.: 925,054

[22] Filed: Sep. 8, 1997

Related U.S. Patent Documents

Reissue of:

[64] Patent No.: 5,551,347
Issued: Sep. 3, 1996
Appl. No.: 424,655
Filed: Apr. 19, 1995

[51] Int. Cl.[6] ..... A63G 25/00

[52] U.S. Cl. ..... 104/53; 104/60; 104/140; 104/250; 104/252; 104/242; 104/248

[58] Field of Search ..... 104/53, 60, 140, 104/145, 305, 242, 244.1, 248, 249, 250, 251, 252, 146; 105/72.2; 238/2, 3, 4, 5, 9

[56] References Cited

U.S. PATENT DOCUMENTS

| | | | |
|---|---|---|---|
| 3,195,472 | 7/1965 | Rannalli | 104/60 |
| 3,202,109 | 8/1965 | Stewart | 104/60 |
| 3,241,263 | 3/1966 | Branstner | 104/140 |
| 3,314,375 | 4/1967 | Russell et al. | 104/60 |
| 3,350,953 | 11/1967 | Stewart | 104/60 |
| 3,410,223 | 11/1968 | Miller | 104/60 |
| 3,782,293 | 1/1974 | Donohue et al. | 104/60 |
| 4,643,102 | 2/1987 | Manresa | 104/305 |
| 4,920,890 | 5/1990 | Barber | 104/53 |
| 4,991,514 | 2/1991 | Powell et al. | 104/60 |
| 5,218,909 | 6/1993 | Ng | 105/305 |
| 5,253,591 | 10/1993 | Rote et al. | 104/139 |
| 5,361,705 | 11/1994 | Powell | 104/60 |

*Primary Examiner*—Mark Tuan Le
*Attorney, Agent, or Firm*—Jack C. Munro

[57] ABSTRACT

An amusement ride for humans which is constructed to include a plurality of separate tracks located in a side-by-side relationship. On each track is located a vehicle, with this vehicle including a propulsion system which is activated and controlled by a human operator located within the vehicle. The vehicle is mounted in conjunction with a track which keeps each vehicle confined to its particular track and permits the vehicle to move between a Start position and Finish position on the track. Associated with each track is an automatic brake system to stop the vehicle. Each track is composed of a plurality of separate guide rail sections which are located in a spaced apart arrangement with the separate guide rail sections being mounted in an in-line manner within the track. A guide blade is mounted on each vehicle and is to connect with each of these guide rail sections as the vehicle moves along the track.

15 Claims, 4 Drawing Sheets

HUMAN AMUSEMENT RIDE

Matter enclosed in heavy brackets [ ] appears in the original patent but forms no part of this reissue specification; matter printed in italics indicates the additions made by reissue.

BACKGROUND OF THE INVENTION

1) Field of the Invention

The field of this invention relates to an amusement ride for humans and more particularly to an amusement ride which is designed to be located as a portable or permanent establishment within an amusement park.

2) Description of the Prior Art

Amusement parks are a common form of entertainment for humans. Included within these amusement parks are a plurality of different types of amusement rides. Amusement rides using automobiles of various types have long been known. However, it has not been known to utilize a dragster vehicle amusement ride.

A dragster type of vehicle is an automobile which races from a standing stop over a preset length course as fast as possible. To construct an amusement ride incorporating a dragster type of vehicle has previously been thought to be unsafe. The vehicle would have to be confined to a particular track and be stoppable even if the operator did not stop the vehicle.

SUMMARY OF THE INVENTION

The amusement ride of the present invention is to include a plurality of parallel tracks, such as for example ten in number of such tracks. Each track is identical and mounted within each track is a vehicle. The vehicle is to be occupied by a human operator. Each track includes a Start position and a Finish position with the typical track length being approximately 370 feet. All the vehicles are to be locked in position by a braking system at the Start position prior to initiation of a race. Each of the vehicles has mounted thereon a guide blade which extends underneath the vehicle. The guide blade engages with a track and specifically engages with a plurality of spaced apart, in-line, series of separate sections of a guide rail assembly. The ends of these sections are mounted in a closely spaced arrangement from each other generally no more than a few inches. Mounted on each guide blade is a retainer bar with this retainer bar being located within a retaining channel mounted within a track. The connection between the retainer bar and the retaining channel prevents vertical disengaging movement of the vehicle relative to the track. Beyond the Finish section of the track there is located a series of separate, longitudinal braking units which are located in a spaced apart manner.

The primary objective of the present invention is to construct an entertaining amusement ride for humans with this ride being permanently located in a theme park or some other similar type of human entertainment area.

Another objective of the present invention is to construct an amusement ride which can be operated in total safety for the operating human even in the event that the human is not able to operate the vehicle.

Another objective of the present invention is to provide an amusement ride which will substantially duplicate the operation of a dragster type of vehicle on a race track.

DETAILED DESCRIPTION OF THE PREFERRED EMBODIMENT

Figure 1:
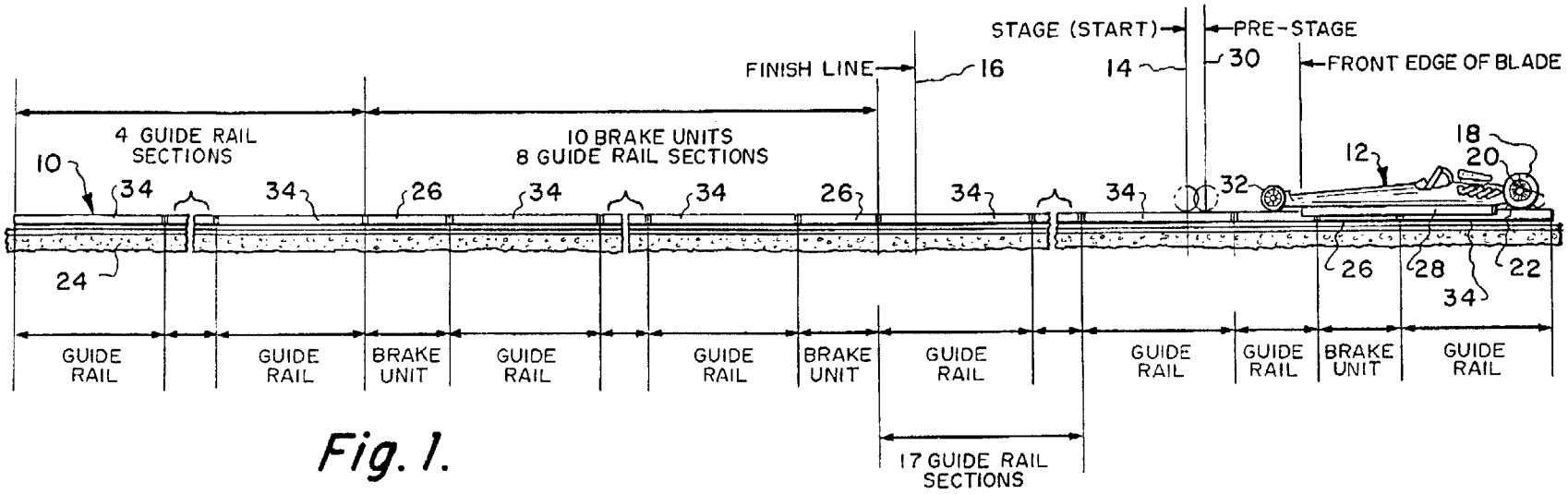
FIG. 1 is an overall schematic view of the track utilized in conjunction with the amusement ride of the present invention showing a vehicle being mounted on the track.
Figure 5:
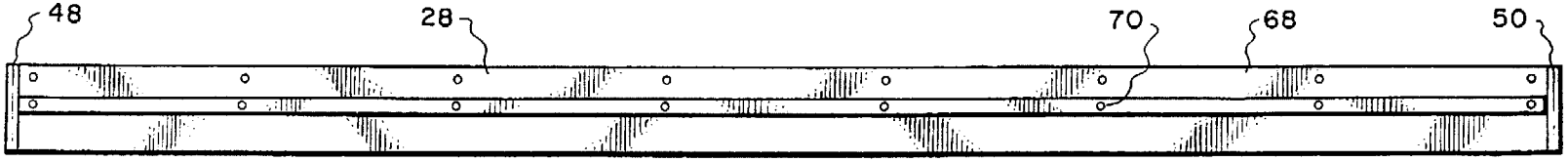
FIG. 5 is a longitudinal cross-sectional view through a portion of the track of the amusement ride of this invention taken along line 5—5 of FIG. 2.
Figure 2:
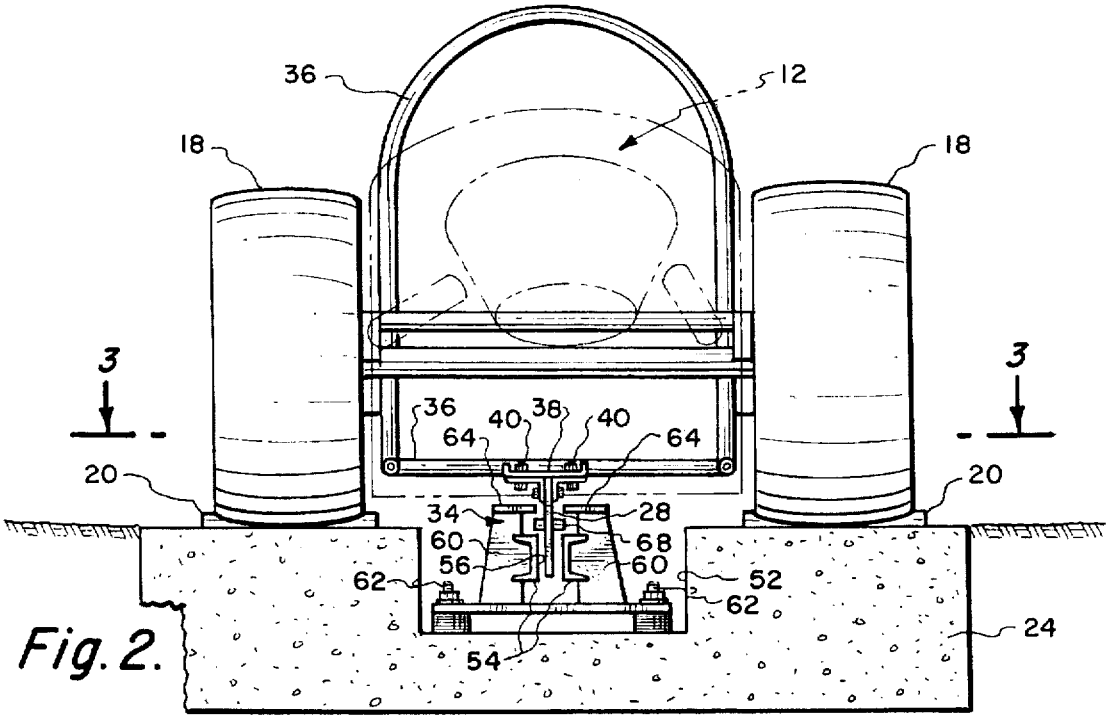
FIG. 2 is a transverse cross-sectional view through the portion of the track to the rear of the Start line showing the position of the vehicle relative to the track.
Figure 6:
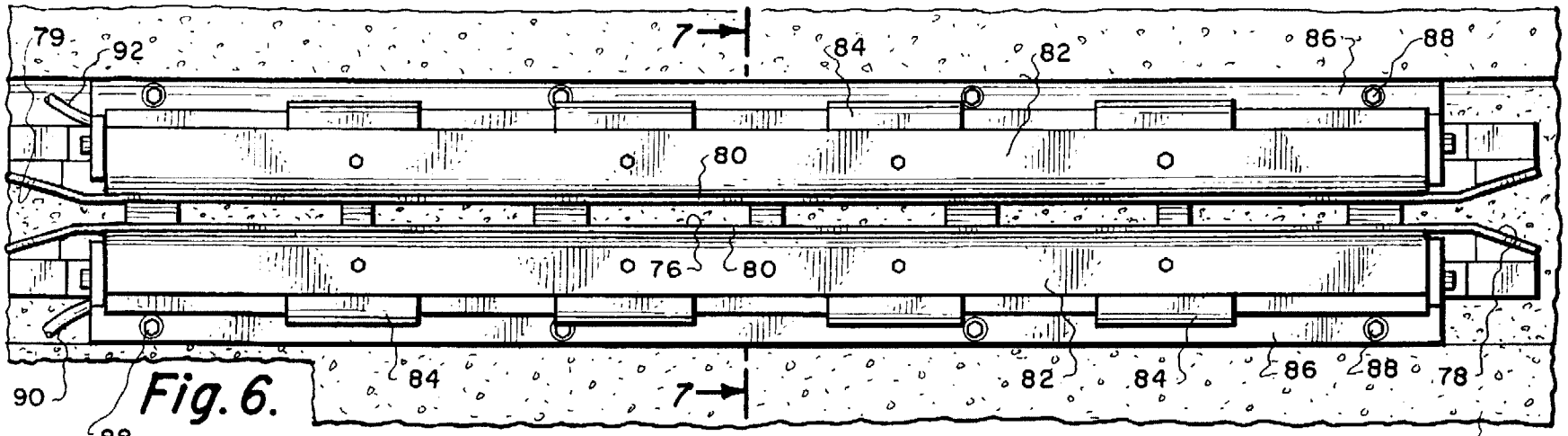
FIG. 6 is a top view of one of the braking units included within the amusement ride of the present invention.
Figure 7:
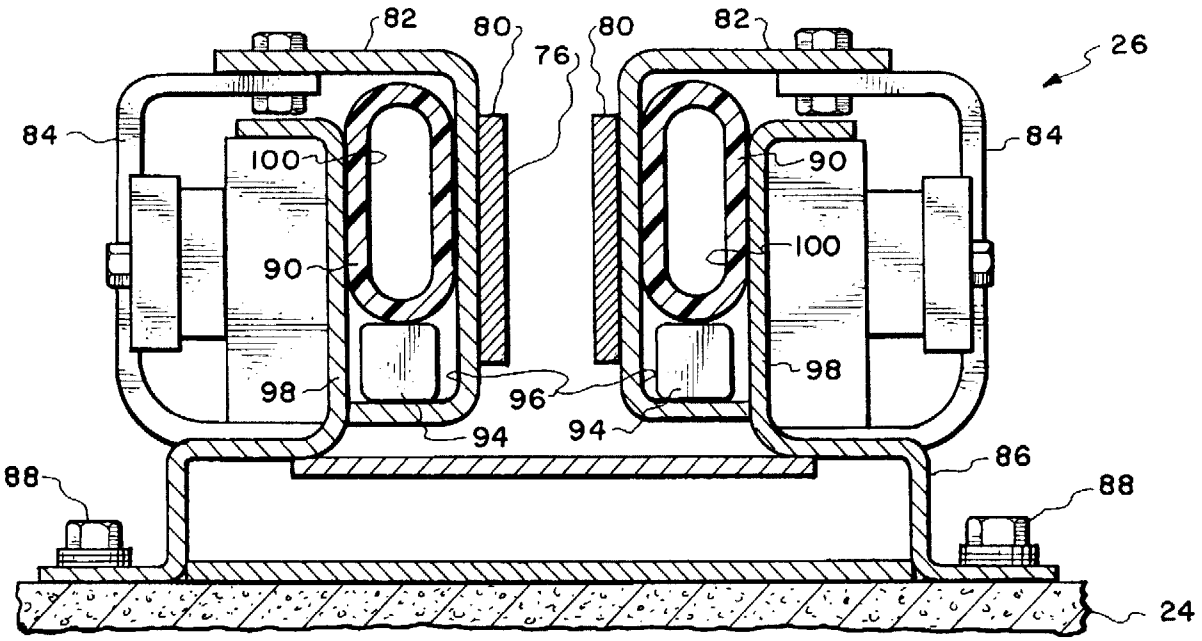
FIG. 7 is a cross-sectional view through one of the braking units taken along line 7—7 of FIG. 6.

Referring particularly to the drawings, there is shown in FIG. 1 a typical arrangement for the track 10 upon which the dragster vehicle 12 is to be operated. Track 10 has a Start line 14 and a Finish line 16. There is to be about 175 feet between the Start line 14 and the Finish line 16. The vehicle 12 is to be located in FIG. 1 in the drawings at which time the human operator is to enter into the vehicle 12. The rear wheels 18 of the vehicle 12 each rest on a pair of rollers 20 and 22. The rollers 20 and 22 are mounted within the cement base 24 of the track 10. The wheels 18 will rest only on the rollers 20 and 22. The wheels 18 constitute the drive wheels for the vehicle 12. The rollers 20 and 22 are permitted to rotate and the operator of the vehicle 12 can rev up the engine of the vehicle 12 while it is in gear and produce a situation similar to conventional drag racers when they "burn out" their tires. While this revving is occurring, there is included a brake unit 26 that is engaged with the guide blade 28 which is mounted under the vehicle 12. The construction of the brake unit 26 is shown in more detail in FIGS. 6 and 7 of the drawings and will be explained further on in the Specification.

The human operator, after completing of the "burn out" of the rear tires 18, is to then slowly move the vehicle 12 toward the Start line 14. This slow movement is permitted because the brake unit 26 will be released. Also the rollers 20 and 22 will be locked in position preventing their rotation. The locking means for the rollers is not shown within the drawings. The human operator is to move the vehicle 12 slowly four and one-half feet to the Pre-stage line 30. It is to be understood that there will be a plurality of tracks 10 located in a side-by-side arrangement with there being a vehicle 12 engaged with each track 10. The Pre-stage line 30 is just before the Start line 14. At this particular position the operator will locate the front wheels 32 of the vehicle 12 at this Pre-stage line 30 and then is to slowly inch forward the vehicle 12 until it reaches the Start line 14. Again, this is a typical mode of operating in an actual drag race.

When the start is initiated for the vehicle 12, the human operator will accelerate the vehicle 12 from the Start line to a maximum speed which will occur at or just prior to the Finish line 16. As the vehicle proceeds past the Finish line, the guide blade 28 will come into contact with the brake units 26 in a sequential manner which were located in the braking position at the time the amusement ride was initiated. Each brake unit 26 will be about five feat in length with there being a guide rail section 34 mounted between each pair of brake units 26. After the Finish line 16, there will be mounted ten brake units 26 and eight guide rail sections 34 within about 130 feet of the track 10. After the last brake unit 26, there will be located forty feet of additional guide rail sections 34. This last forty feet of guide rail sections is for the purpose of providing additional stopping area for the vehicle 12 if such is needed.

The vehicle 12 includes a metallic tubular frame 36. Welded to the frame 36 are a plurality of U-shaped brackets 38. Generally there will be at least four to five in number of the brackets starting adjacent the front wheels 32 and proceeding back toward the rear wheels 18. These brackets 38 will be longitudinally oriented along the longitudinal center axis of the vehicle 12. The approximate distance from the rearward most bracket 38 to the forward most bracket 38 will be about twelve feet with the total length of the vehicle being about seventeen feet. The brackets 38 are bolted by bolts 40 to a pair of L-shaped members 42. The L-shaped brackets 42 are to be positioned so that there is a slight space 44 therebetween. Mounted within that space 44 is the guide blade 28 with bolts 46 being used to securely fix the guide blade to the brackets 38 and hence, to the frame 36 of the vehicle 12. The total length of the guide blade 28 will be approximately twelve feet. The forward most edge 48 of the guide blade 28 is sharply pointed as is also the rearward most edge 50. The reason for this pointing of the edges of the guide blade is so that these edges will function as a cam surface as it moves along the track 10 between the separate (spaced apart) guide rail sections 34 and brake units 26.

Cement section 24 is to be poured within the ground or other surface so as to include a center channel 52. It is within that center channel 52 that the guide rail sections 34 and the brake units 26 are to be located. Each guide rail section 34 is ten feet in length (actually nine feet ten inches) with the exception of a single guide rail section of five feet in length located directly adjacent the Pre-stage line 30. Each guide rail section 34 is to be composed of a pair of oppositely facing U-shaped members 54 which are located so as to form a slot 56 therebetween. The guide blade 28 will be positioned within the slot 56. The members 54 will normally be constructed of steel. The members 54 are fixedly mounted on a pair of upstanding plates 60 with it being understood that there is only a U-shaped member 54 mounted on a single upstanding plate 60. The upstanding plates 60 are in turn welded to a base plate 58. Each base plate 58 is fixedly mounted by bolts 62 to the cement 24.

Figure 4:
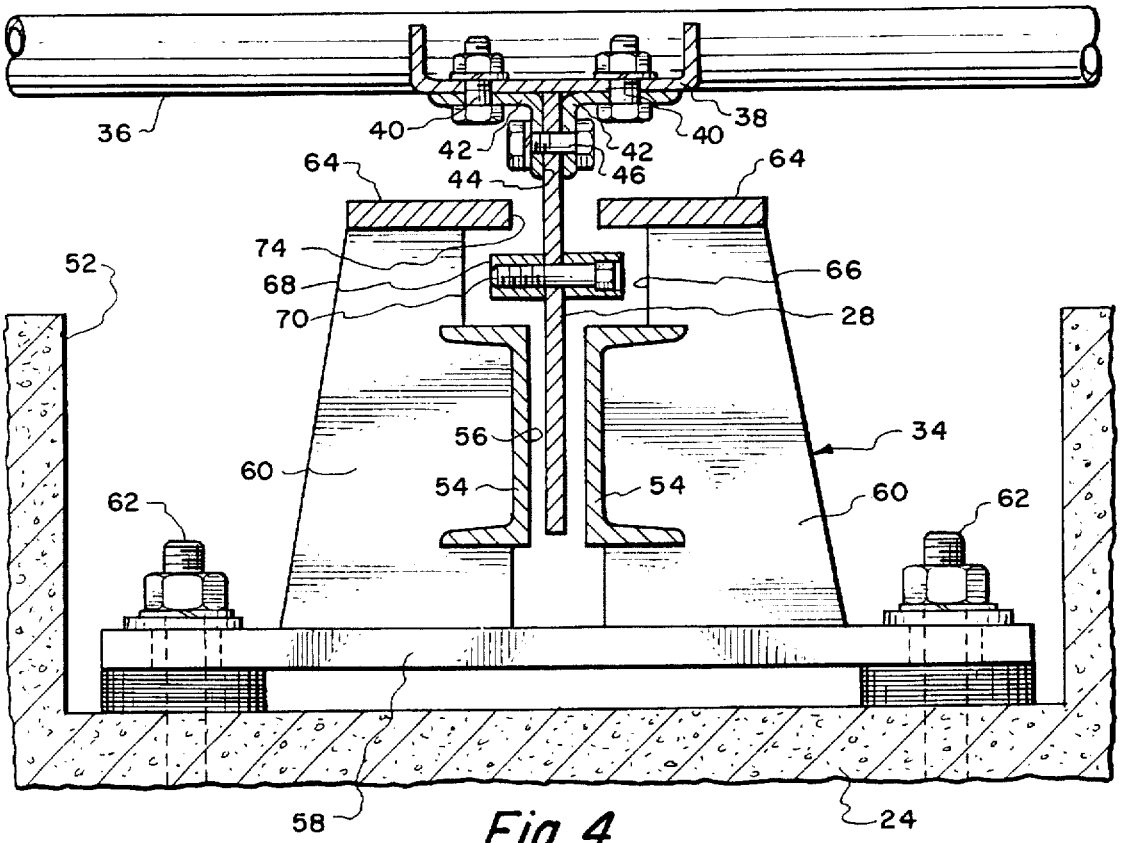
FIG. 4 is a cross-sectional view through a portion of the track of the amusement ride of this invention taken along line 4—4 of FIG. 3.
Figure 3:
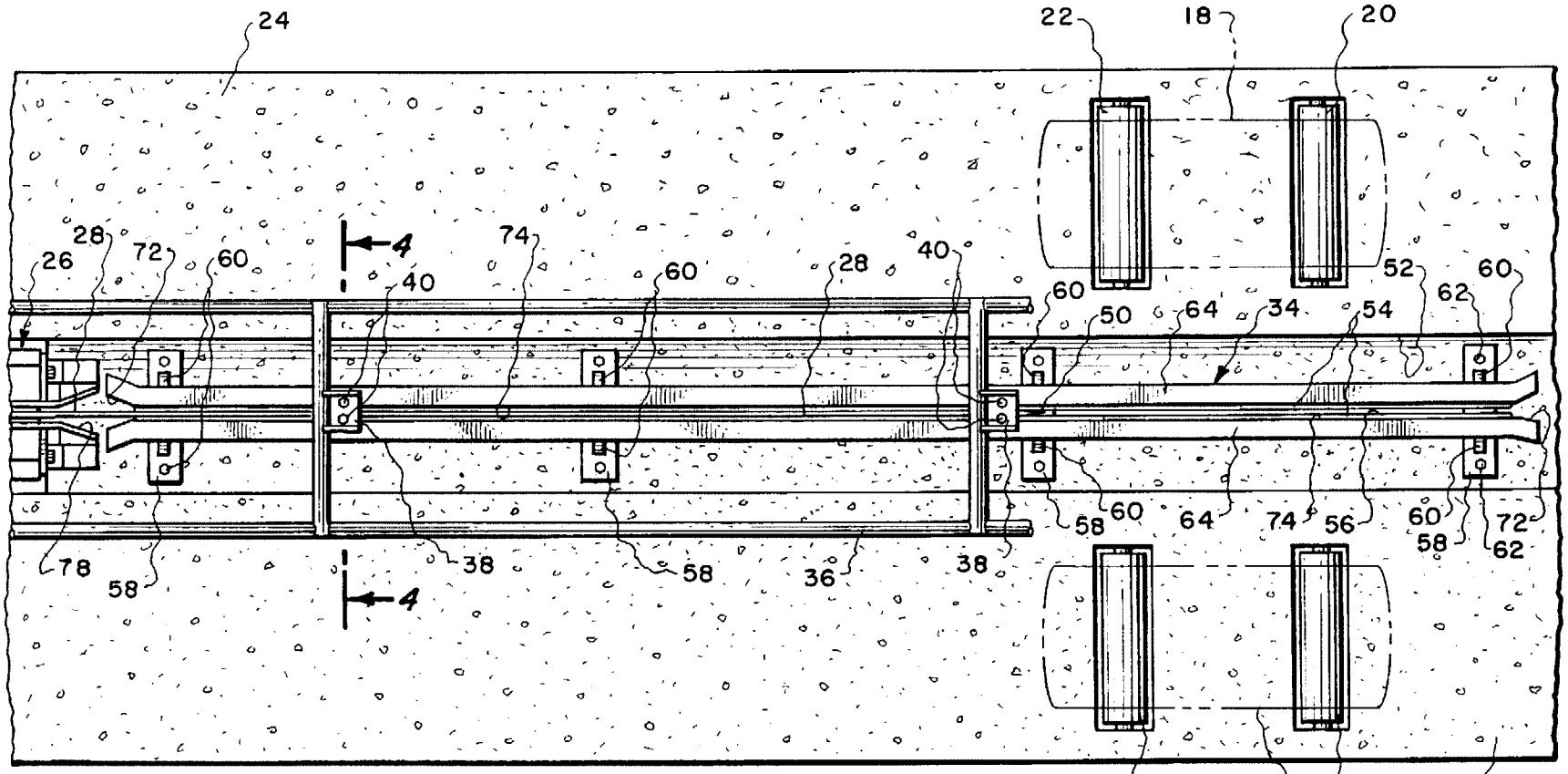
FIG. 3 is a top plan view of the track taken along line 3—3 of FIG. 2 showing the position of the vehicle in phantom lines relative to the track.

The upstanding plates 60 are each covered by a top plate 64 with it being understood that there are two in number of top plates 64 extending the entire longitudinal length of the guide rail section 34. The top plates 64 form a space which is defined as a retaining channel 66 between the top plates 64 and U-shaped members 54. Within the retaining channel 66 is to be located a retainer bar 68. The retainer bar 68 is actually composed of two sections, one on the right side of the guide blade 28 and the other on the left side of the guide blade 28 which are secured together by means of a series of bolts 70. This can be readily seen in FIG. 4. The retainer bar 68 will prevent the guide blade from disengaging from the slot 66 by movement in an upward direction since the retainer bar 68 will come into contact with the undersurface of the top plates 64 and prevent this upward directional movement. This is to make sure that the vehicle 12 will always remain connected to the track 10 with separation of the vehicle from the track 10 being prevented in the upward direction.

The end of each guide rail section 34 is flared in an outwardly directed manner. This means that the top plates 64 are actually shaped outwardly to form an increased area 72 of the space 74 between the top plates 64. This flaring of the ends of the guide rail section 34, coupled with the sharp pointed creation of the ends of the guide blade 28, such as is shown at 48 and 50, ensure that as the vehicle 12 moves alone the track 10, it will smoothly engage with each guide rail section 34 as it moves from one section to the other. It is to be understood that there is a spacing between the guide rail sections 34 of generally a few inches. This is desirable so as to provide room for installation and alignment as the guide rail sections 34 are installed. These ton foot lengths for the guide rail sections 34 are a convenient size to be installed. Grater lengths for the guide rail sections 34 would result in these sections becoming hard to handle and difficult to install.

Each of the brake units 26 are in themselves deemed to be conventional and are in common use in conjunction with amusement rides such as roller coasters. Each brake unit 26 has a longitudinal through opening 76 which is to be aligned with the slots 56 of the guide rail sections 34. Each end of the brake units 26 are flared forming widened slot areas 78 and 79. Again the flaring of the ends 78 and 79 is for the same reason that the guide rail section 34 is flared at ends 72. Each brake unit 26 includes a pair of brake pads 80. Each brake pad 80 is mounted on a U-shaped member 82 with it being understood that there are two U-shaped members 82. Each U-shaped member 82 is adjustably mounted on a frame member 84. The frame members 84 are fixedly secured to a base 86 with this base 86 being fixedly mounted on the cement 24 by means of bolt fasteners 88.

Located interiorly of the U-shaped member 82 is an elastomeric bladder 90 with it being understood there are two in number of such bladders 90. The bladders 90 are connected through supply tubes 92 to a source (not shown) of pressurized air. The bladders 90 each rest on a spacer block 94 located within the space 96 formed between the U-shaped member 82 and the fixed upward extension section 98 of the base 86. Therefore, by supplying pressurized air into the interior chamber 100 of the bladders 90, the U-shaped members 82 will be moved *from a non-braking position* relative to the frame members 84 *to a braking position* slightly closing the space 76 therebetween. [This] *The braking position* will result in applying of a braking force onto the guide blade 28 by brake pads 80 *when the guide blade 28 is located in juxtaposition with brake pads 80.*

After the vehicle 10 has reached the Finish line 16, almost immediately the first brake unit 26 will start to apply pressure to the guide blade 28. This will start the stopping process for the vehicle 12. The guide blade is twelve feet in length. So as it slides through the first brake unit 26 after the Finish line 16, it will then move through a ten foot guide rail section 34 and then come into contact with a second brake unit while it is still engaged with the first brake unit 26. Actually, for about two feet in length at each end of the guide blade 28, the guide blade 28 will be engaged with two separate brake units 26. Since braking force is directly proportional to the area of the braking surface, when the guide blade 28 gets to the last two feet of engagement with a braking unit 26, the braking force is substantially decreased. However, by engaging the guide blade 28 with another brake unit 26, increased braking force is obtained. This stopping procedure will continue through the entire series of brake units which will be ten in number over the one hundred and thirty foot length. At the end of this one hundred and thirty foot length, the vehicle 12 should be completely stopped and actually should be stopped by the sixth or seventh brake unit, not requiring usage of all ten.

When the vehicle has come to a stop, the vehicle is put into reverse by the operator and moved back to the starting position with the tires 18 reengaging with the rollers 20. Brake unit 26 located near the Start line is used to slow the reverse speed of the vehicle as it approaches the rollers 20 and 22. At this time there should be a change of human operators for the vehicle 10 with the operating procedure for the vehicle 12 to be repeated on the track 10.

What is claimed is:

1. A human amusement ride comprising:

a track having a Start position, a Finish position and a braking area located past said Finish position;

a vehicle within which a human is to be located, said vehicle being mounted on said track, said vehicle to move from said Start position to said Finish position and then into said braking area;

a guide rail assembly included within said track, said guide rail assembly being formed of a plurality of separate guide rail sections, each said guide rail section having a longitudinal through slot, said guide rail sections being mounted in an in-line manner with said slots being aligned, said guide rail sections being slightly spaced apart from each other, each said slot terminating in ends;

a guide blade mounted on said vehicle, said guide blade to connect with said slots as said vehicle moves along said track, said guide blade to be continuously in engagement with said slots; and said track including a retaining channel, a retainer bar mounted on said guide blade, said retainer bar to be located within said retaining channel, said retainer bar to prevent vertical movement of said vehicle sufficient to result in disengagement of said vehicle from said track.

2. The human amusement ride as defined in claim 1 wherein:

each said end of each said guide rail section being flared forming an increased width of said slot.

3. The human amusement ride as defined in claim 1 wherein:

said guide blade being greater than one-half the length of said vehicle.

4. The human amusement ride as defined in claim 1 wherein:

said track having a plurality of rollers located directly adjacent said Start position, said vehicle having rear wheels, said rear wheels to be locatable on said rollers, whereby the human can cause said rear wheels to spin on said rollers prior to moving on said track from said Start position to said Finish position.

5. The human amusement ride as defined in claim 1 including:

a braking arrangement mounted within said braking area of said track, said braking arrangement including a plurality of separate brake units, said separate brake units being located in a spaced apart arrangement.

6. The human amusement ride as defined in claim 5 wherein:

each said brake unit having a longitudinal length of approximately five feet, said brake units being spaced apart approximately ten feet.

7. The human amusement ride as defined in claim 5 wherein:

said braking arrangement including a single brake unit located directly adjacent said Start position, the remaining said brake units being located directly adjacent said Finish position.

8. The human amusement ride as defined in claim 7 wherein:

each said end of each said guide rail section being flared forming an increased width of said slot.

9. The human amusement ride as defined in claim 8 wherein:

said guide blade being greater than one-half the length of said vehicle.

10. The human amusement ride as defined in claim 9 wherein:

said track having a plurality of rollers located directly adjacent said Start position, said vehicle having rear wheels, said rear wheels to be locatable on said rollers, whereby the human can cause said rear wheels to spin on said rollers prior to moving on said track from said Start position to said Finish position.

*11. A human amusement ride comprising:*

*a track having a Start position, a Finish position and a braking area located past said Finish position;*

*a vehicle within which a human is to be located, said vehicle being mounted on said track, said vehicle to move from said Start position to said Finish position and then into said braking area;*

*a guide rail assembly included within said track, said guide rail assembly having at least one guide rail section, said guide rail section having a longitudinal through slot;*

*a guide blade mounted on said vehicle, said guide blade to connect with said slot as said vehicle that moves along said track, said guide blade to be continuously in engagement with said slot; and*

*a braking arrangement mounted within said braking area of said track, said braking arrangement being positioned to move between a non-braking position and a braking position, said braking arrangement, in said braking position, applying a force against said guide blade to cause said vehicle to slow, said guide blade being positioned to both guide said vehicle in conjunction with said slot and brake said vehicle by said braking arrangement.*

*12. A human amusement ride comprising:*

*a track having a Start position, a Finish position and a braking area located past said Finish position;*

*a vehicle within which a human is to be located, said vehicle being mounted on said track, said vehicle to move from said Start position to said Finish position and then into said braking area;*

*a guide rail assembly included within said track, said guide rail assembly having at least one guide rail section, said guide rail section having a longitudinal through slot;*

*a guide blade mounted on said vehicle, said guide blade to connect with said slot as said vehicle that moves along said track, said guide blade to be continuously in engagement with said slot; and*

*said guide blade being greater than one-half the length of said vehicle.*

*13. The human amusement ride as defined in claim 11 wherein:*

*said braking arrangement including a plurality of separate brake units, said separate brake units being located in a spaced-apart arrangement.*

*14. The human amusement ride as defined in claim 13 wherein:*

*each said brake unit having a longitudinal length of approximately five feet, said brake units being spaced-apart approximately ten feet.*

*15. The human amusement ride as defined in claim 14, wherein:*

*said braking arrangement also including a single brake unit located directly adjacent said Start position, the remaining said brake units being located directly adjacent said Finish position.*

* * * * *